April 26, 1927.

V. R. GOELLER 1,626,460

TIRE SPREADER

Filed Nov. 12, 1926

WITNESSES

INVENTOR
Vernon R. Goeller,
BY
ATTORNEY

Patented Apr. 26, 1927.

1,626,460

UNITED STATES PATENT OFFICE.

VERNON R. GOELLER, OF BOONTON, NEW JERSEY.

TIRE SPREADER.

Application filed November 12, 1926. Serial No. 148,046.

The present invention is concerned with the provision of a tool intended for spreading open an automobile tire either for purposes of repair or to permit inspection of the inside of a shoe.

An object of the invention is to provide a tool of this nature so constructed that it may be conveniently used in connection with all sizes of tires, and which not only serves to spread the tire at one point, but is capable of being shifted around the tire to progressively open up the latter throughout its entire length, so that an entire tire may be inspected without removing the tool from its operative position therein.

Another object of the invention is to provide a spreader in which a series of rollers are used to retain the tire flanges in properly spaced position, the rollers being so constructed that they afford traction means for shifting the spreading tool around the inside of the tire.

A further object of the invention is to provide a novel mechanism which will permit the ready collapse of the spreading means and its removal from the shoe after it has served its purpose.

Other and more general objects of the invention are to provide a tool of simple, practical construction which will be rugged, durable and efficient in use, well suited to the requirements of economical manufacture and capable of manipulation with expedition and facility.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
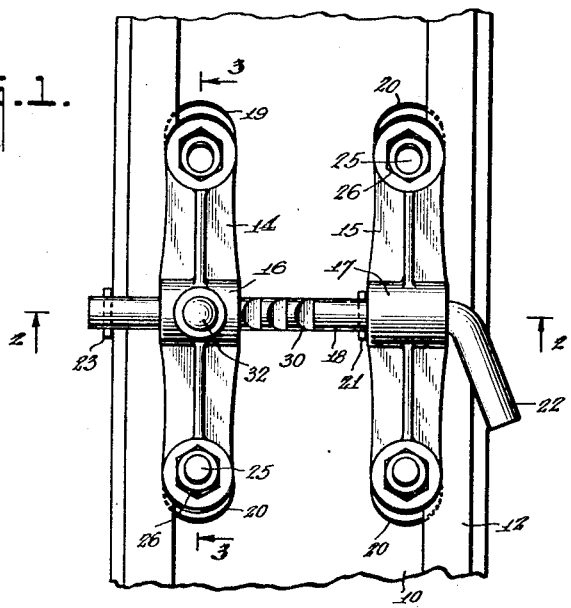
Fig. 1 is a fragmentary plan view of the inside of a tire showing the tool in applied position to spread the tire casing open.
Figure 2:
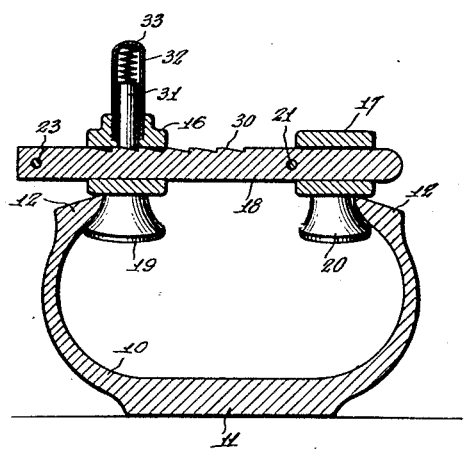
Fig. 2 is a transverse sectional view on the line 2—2 of Fig. 1.
Figure 3:
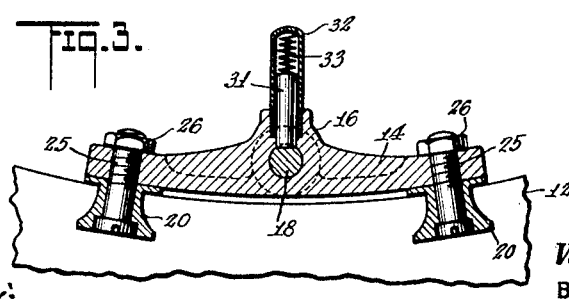
Fig. 3 is a longitudinal sectional view on the line 3—3 of Fig. 1.

In the drawings I have used the reference character 10 to designate a tire shoe which may be of conventional construction including the usual tread portion 11, and beads 12 adapted to be spread apart for the insertion of an inner tube or for the purpose of permitting inspection or repair of the shoe 10.

The spreader includes a pair of parallel arm portions 14 and 15 formed with central bearings 16 and 17 mounted for a relative sliding movement to effect advance or separation of the arms along a transverse shank or spindle 18. The ends of the arm 14 carry rollers 19 adapted to engage one bead of the tire and the free ends of the arm 15 carry rollers 20 engageable with the opposite bead as the two arms are separated along the shank 18. Preferably the arm 15 is stationary relative to the shank 18, being confined between a stop pin 21 and an offset end 22 of the shank which constitutes a handle. Arm 14 on the other hand is slidable along the shank between the pin 21 and a pin 23.

The rollers 19 and 20 are preferably shaped to interlock with the inner faces of the tire beads 12, these rollers being of general concave conical formation at their exterior surfaces, and being journalled on screws or bolts 25 retained in position by nuts 26.

Means is provided for locking the two arms 14 and 15 in any desired position of relative separation. This means may conveniently comprise a series of ratchet teeth 30 which are formed as notches in one side of the shank 18, and which are engaged by a spring pressed pawl 31 projecting radially inwardly through the hub 16. Pawl 31 is preferably guided for sliding movement in a tubular casing 32 which houses its actuating spring 33.

The operation of the device is substantially as follows. The two tire beads are slightly spread to permit the insertion of the tool with the opposite sides of rollers resting against the inner faces of the opposite beads. Arms 14 and 15 are then manually separated and the pawl or dog 31 will drop into one of the notches 30 to prevent relative advance of the arms toward each other, under the pressure exerted by the resilient shoe. With the parts in this position the intermediate portion of the shank may be used as a handle, and the tool rolled around the tire to successively open and expose the entire interior thereof for purposes of inspection or repair. When it is desired to remove the spreading tool, it is simply necessary to rotate the offset handle portion 22 to a point where the notches 30 are moved out of alignment with the pawl 31, at which time the action of the beads 12 will slide the arms 14 and 15 together, collapsing the tool and permitting removal thereof.

It is to be noted that the shape of the rollers 19 and 20 is such that there is no danger of the tool jumping out of the tire or becoming disengaged therefrom as it is moved around to successively expand adjacent portions of the tire.

The extent to which it is necessary to rotate the handle 22 to disengage the ratchet teeth 30 from the pawl, is entirely a matter of design, but I find that the tool may be conveniently constructed, so that a quarter revolution of the handle in either direction will accomplish the desired result.

Obviously numerous changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A tire spreading tool including a spindle, a pair of parallel arms mounted for relative sliding movement toward or away from each other on the spindle, tire bead engaging means carried by the arms, and means for automatically locking the arms against relative advance as they are forcibly separated against the action of a tire to be expanded.

2. A tire spreading tool including a spindle, a pair of parallel arms mounted for relative sliding movement toward or away from each other on the spindle, tire bead engaging means carried by the arms, and means for automatically locking the arms against relative advance as they are forcibly separated against the action of a tire to be expanded, the tire engaging means including rollers at the ends of the arms.

3. A tire spreading tool including a spindle, a pair of parallel arms mounted for relative sliding movement toward or away from each other on the spindle, tire bead engaging means carried by the arms, and means for automatically locking the arms against relative advance as they are forcibly separated against the action of a tire to be expanded, the tire engaging means including rollers at the ends of the arms, said rollers being of concave conical formation adapted to interlock with the tire beads and to serve as traction means as the spreading tool is passed around the tire to progressively expand the latter.

4. A tire spreading tool including a spindle, a pair of parallel arms mounted for relative sliding movement toward or away from each other on the spindle, tire bead engaging means carried by the arms, and means for automatically locking the arms against relative advance as they are forcibly separated against the action of a tire to be expanded, the arms including hubs at their intermediate portions encircling the spindle and a dog carried by one hub engageable on the ratchet means on the shank.

5. A tire spreading tool including a spindle, a pair of parallel arms mounted for relative sliding movement toward or away from each other on the spindle, tire bead engaging means carried by the arms, and means for automatically locking the arms against relative advance as they are forcibly separated against the action of a tire to be expanded, the arms including hubs at their intermediate portions encircling the shank and a dog carried by one hub engageable on the ratchet means on the shank, the ratchet means comprising ratchet teeth formed by notching one side of the shank.

6. A tire spreading tool including a spindle, a pair of parallel arms mounted for relative sliding movement toward or away from each other on the spindle, tire bead engaging means carried by the arms, and means for automatically locking the arms against relative advance as they are forcibly separated against the action of a tire to be expanded, the arms including hubs at their intermediate portions encircling the shank and a dog carried by one hub engageable on the ratchet means on the shank, the ratchet means comprising ratchet teeth formed by notching one side of the shank, and a handle for rotating the shank to disengage the teeth from the dog and permit the action of the tire to collapse the tool.

7. A tire spreading tool including a spindle, a pair of tire spreading elements mounted for relative sliding movement toward or away from each other on the spindle, tire bead engaging means carried by said elements, and means acting to automatically lock said elements against relative advance as they are forcibly separated against the action of a tire to be expanded.

VERNON R. GOELLER.